United States Patent
Breer et al.

(10) Patent No.: US 11,084,460 B2
(45) Date of Patent: Aug. 10, 2021

(54) METHOD FOR ACTIVATION OF AT LEAST ONE SECURITY FUNCTION OF A SECURITY SYSTEM OF A VEHICLE

(71) Applicant: Huf Hülsbeck & Fürst GmbH & Co. KG, Velbert (DE)

(72) Inventors: Jan Breer, Essen (DE); Marc Feldsieper, Hattingen (DE); Matthias Ihln, Düsseldorf (DE); Stefan Neuhoff, Essen (DE); Mirko Schindler, Velbert (DE); Thomas Skaletz, Meerbusch (DE); Boris Ziller, Ratingen (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 232 days.

(21) Appl. No.: 16/080,022

(22) PCT Filed: Feb. 16, 2017

(86) PCT No.: PCT/EP2017/053532
§ 371 (c)(1),
(2) Date: Aug. 27, 2018

(87) PCT Pub. No.: WO2017/144346
PCT Pub. Date: Aug. 31, 2017

(65) Prior Publication Data
US 2019/0061689 A1    Feb. 28, 2019

(30) Foreign Application Priority Data
Feb. 26, 2016  (DE) ............... 10 2016 103 476.2

(51) Int. Cl.
*B60R 25/24* (2013.01)
*B60R 25/10* (2013.01)
(Continued)

(52) U.S. Cl.
CPC ........ *B60R 25/245* (2013.01); *B60R 25/1003* (2013.01); *B60R 25/2081* (2013.01);
(Continued)

(58) Field of Classification Search
None
See application file for complete search history.

(56) References Cited

U.S. PATENT DOCUMENTS

2016/0059827 A1* 3/2016 Uddin ............... H04B 1/71637
                                                           701/2
2016/0320469 A1* 11/2016 Laifenfeld ............... G01S 5/14

FOREIGN PATENT DOCUMENTS

CN    104796430    7/2015
DE    10064141     7/2002
(Continued)

OTHER PUBLICATIONS

International Search Report and the Written Opinion dated May 15, 2017 From the International Searching Authority Re. Application No. PCT/EP2017/053532 and the Translation of Search Report Into English. (17 Pages).
(Continued)

*Primary Examiner* — Kelly D Williams

(57) ABSTRACT

The invention relates to a method (100) for a security system (200) of a vehicle (1), in particular for a keyless activation of at least one security function of the vehicle (1).

21 Claims, 7 Drawing Sheets

(51) Int. Cl.
    *B60R 25/20*    (2013.01)
    *E05F 15/76*    (2015.01)

(52) U.S. Cl.
    CPC ... *B60R 2325/101* (2013.01); *B60R 2325/108* (2013.01); *B60R 2325/40* (2013.01); *E05F 15/76* (2015.01); *E05Y 2400/85* (2013.01); *E05Y 2900/531* (2013.01)

(56) References Cited

FOREIGN PATENT DOCUMENTS

| DE | 10334625 | 3/2005 |
|---|---|---|
| DE | 102005032402 | 9/2006 |
| DE | 202005020140 | 5/2007 |
| DE | 102013220240 | 4/2015 |
| EP | 0892134 | 1/1999 |
| JP | 2014-227647 | 12/2014 |
| WO | WO 2017/144346 | 8/2017 |

OTHER PUBLICATIONS

Mitteilung Gemaess Artikel 94(3) EPUE [Communication Pursuant to Article 94(3) EPC] dated Jun. 24, 2020 From the European Patent Office Re. Application No. 17705419.4 and Its Summary in English. (6 Pages).

Notification of Office Action and Search Report dated Jul. 29, 2020 From the China National Intellectual Property Administration Re. Application No. 201780010427.1 and Its Translation Into English. (15 Pages).

Notification of Office Action and Search Report dated Mar. 10, 2021 From the National Intellectual Property Administration of the People's Republic of China Re. Application No. 201780010427.1 and Its Translation of Office Action Into English. (18 Pages).

* cited by examiner

METHOD FOR ACTIVATION OF AT LEAST ONE SECURITY FUNCTION OF A SECURITY SYSTEM OF A VEHICLE

RELATED APPLICATIONS

This application is a National Phase of PCT Patent Application No. PCT/EP2017/053532 having International filing date of Feb. 16, 2017, which claims the benefit of priority of German Patent Application No. 10 2016 103 476.2 filed on Feb. 26, 2016. The contents of the above applications are all incorporated by reference as if fully set forth herein in their entirety.

FIELD AND BACKGROUND OF THE INVENTION

The present invention relates to a method for activation of at least one security function of a security system of a vehicle according to the preamble of claim 1. Furthermore, the invention relates to a security system according to the preamble of claim 17 as well as to a mobile identification transmitter according to the preamble of claim 19.

Mobile identification transmitters (ID transponders) are used as electronic keys in order to enable the unlocking of a security system of a vehicle as an alternative to mechanical keys. Furthermore, ID transponders can be used for numerous further tasks in vehicles to increase user convenience and security. Infrared systems or radio systems in the low frequency (LF) range are usually employed for the communication of the ID transponder with the vehicle (with the security system of the vehicle, respectively). Authentication data can thereby be transmitted in a contactless (wireless) manner, and thereby the access data can be verified, in order to enable an unlocking in the event of a positive authentication.

The authentication can be initiated, for example, by a user of the vehicle by pushing a button. Through such an active actuation of the identification transmitter by the user, the signal with the authentication information, e.g. with access data such as a code, is sent to a vehicle-sided electronics of the security system. Such systems are also referred to as Active Keyless-Entry systems (if for example a button has to be pushed actively). Besides Active Keyless-Entry systems, security systems having the so-called Passive Keyless-Entry or Keyless-Go functions are used more and more. In contrast to the conventional remote control, an active actuation of the ID transponder (i.e. without pushing a button) by the user is not required in the Passive Keyless Entry functionality. For example, if a user approaches the vehicle, or actuates a door handle, a wake-up signal can be transmitted to the identification transmitter from the vehicle via a radio connection, in particular a LF (Low Frequency radio connection). The ID transponder will be woken up thereupon, and sends a signal with the authentication code to the security system of the vehicle.

It turned out to be a disadvantage that in such systems, in particular in Keyless-Go systems, elaborate security mechanisms are to be implemented to protect the vehicle against manipulation and theft. For example, measures must be taken in order to avoid the unauthorized activation of a security function of the vehicle, e.g. the unlocking and/or the engine start of the vehicle, via a so-called "Relay station attack". This requires complex and expensive measures, which allow, for example, a determination of an actual distance between the ID transponder and the vehicle. However, a detection and evaluation of such distance information is often too unprecise, unreliable and/or manipulable.

SUMMARY OF THE INVENTION

Thus, it is an object of the present invention to at least partially overcome the above-mentioned disadvantages. In particular, it is an object of the present invention to enable a more cost-efficient, safe and/or reliable activation of security functions of a vehicle. In particular, the preciseness and/or security in the distance determination and/or evaluation of the distance information is to be increased.

The above object is achieved by means of a method having the features of claim 1, by means of a security system having the features of claim 17 as well as by means of a mobile identification transmitter having the features of claim 19. Further features and details of the invention result from the respective dependent claims, the description and the drawings. Here, features and details described in conjunction with the method according to the invention naturally also apply in conjunction with the mobile identification transmitter according to the invention as well as the security system according to the invention, and vice versa, so that reference is or can always be made mutually to the individual aspects of the invention in regard to the disclosure.

The object is preferably achieved by means of a method for a security system of a vehicle, in particular for a preferably keyless and/or Passive Keyless-Entry and/or Keyless-Go activation of at least one security function of the preferably keyless and/or Passive-Keyless-Entry and/or Keyless-Go security system of the vehicle. To that end, it is in particular provided that the following steps are carried out, e.g. successively or on any order:
  monitoring an approach of a mobile identification transmitter (300) to the vehicle,
  initiating at least (e.g. first and/or second) distance determination, in particular (only) when the approach is detected,
  carrying out the distance determination, wherein at least one distance information about a distance (e.g. proximity) of the identification transmitter to the vehicle is determined in that at least one communication, in particular radio communication, between a transceiver of the identification transmitter and a communication device of the vehicle is evaluated,
  evaluating the distance information by means of a processing device of the vehicle, whereby a localization of the identification transmitter relative to the at least one (e.g. first and/or second) security zone is effected,
wherein a security information for the security system (200) is determined dependent upon the localization. In other words, a distance determination and/or the localization is used to increase the security in the authentication process. In particular, at least one communication is used here, wherein e.g. likewise a first and a second communication are activated via respective different communication types are used in a supportive manner, in order to be activated, for example, dependent upon a first and second security zone. Preferably, in the distance determination and/or in the localization, the determination of the distance takes place as a determination of a specific distance, e.g. by means of a time-of-flight analysis of a communication signal of the communication and/or on the basis of properties of the communication signal, which change in accordance with the distance.

Preferably, the determination of the at least one distance information about the distance of the mobile identification transmitter to the vehicle is effected by means of the distance determination based on at least one, preferably wideband communication signal of the communication in such a way that the signal transit time of the signal of at least a first or a second or a third or further, preferably wideband communication signals is evaluated, preferably by a "time-of-flight" analysis and/or by a "ping" analysis of the at least one communication signal. Here, the ping analysis includes, for example, the emission of one or multiple distance determination signals (e.g. information transmitted via the communication or the communication signal), such as data packets, which are sent from the sender (e.g. the vehicle, or alternatively the ID transponder). In particular, the data packets are subsequently received and/or sent back by the receiver (e.g. the ID transponder or alternatively the vehicle) and/or a reply signal (including a reply information) is sent back. The return information (e.g. the data package or the reply information) and/or the time period until the receipt of this information is evaluated then by the sender for the determination of the signal transit time of the signal or for the distance determination.

Particularly preferably, the transmission path is measured by means of ultra-wideband (UWB) for the distance determination, or of the communication signal as a UWB communication signal, in order to this way prevent an extension of the transmission path of an LF-Signal, for example. Based upon the distance determination, it can be determined, for example, whether a manipulation of the transmission path between the ID transponder and the vehicle or between the receiver of the vehicle (such as a detection device and/or a communication device and/or a communication unit) has taken place. In particular, an authentication and/or determination of a (positive) security information for the authorization of the activation of the security function is effected only if the reply period is short enough, it is ensured that an extension of the transmission path has not occurred. Then, the evaluation of the reply period corresponds to the localization in this case. The reply periods are e.g. in the nanosecond range, for example, in a range between 1 ns and 1000 ns, for example, preferably 100 ns to 100 ns, and/or are selected in such a way that the ID transponder must be situated at a security distance of not more than 1 m or not more than 2 m or not more than 6 m or not more than 10 m or not more than 100 m away from the vehicle (i.e. must be located within a first or second security zone, for example).

The security information is, for example, an information for the security system that releases the security function, e.g. the unblocking of the vehicle. This provides the advantage that a manipulation attempt at the authentication process, e.g. an authentication through an amplification of the authentication signal over a too long path, can be detected and prevented by the localization. In particular, the communication with the ID transponder can be directly used for the localization here (instead of localizing via external systems such as GPS), whereby the complexity and the costs for the implementation of the localization can be reduced. Here, communication is effected, for example, as a first and/or a second communication and/or between a transceiver device of the ID transponder and a detection and/or communication device of the vehicle, wherein the detection device includes the communication device, for example. Preferably, the detection device and/or the communication device is formed as a radio communication device for radio communication.

Advantageously, it can be provided that the activation of the security function is effected dependent upon a security information, which e.g. is determined dependent upon the distance information. For example, the security information includes an information whether the ID transponder is situated within a security zone around the vehicle and/or a maximum distance between the vehicle and the ID transponder is not exceeded. Preferably, activation of the security function is only effected if the ID transponder is located within said (e.g. first and/or second) security zone and/or further conditions are met, such as the positive verification of an authentication code or the like. Here, the security zone extends around the vehicle, for example, in particular with a specific maximum radius (starting from the vehicle). This allows improving the security in the authentication process, in particular when using a keyless activation. The keyless activation of the security function preferably means that the vehicle can be unlocked without actively using an ID transponder (e.g. a car key) and/or can be started by the mere actuation of the start button. Such a keyless activation is, for example, comprised by the so-called Passive Entry/Passive-Start (PEPS) functionality.

Preferably, besides the successful authentication by the ID transponder, the determination of the security information, preferably the information about the successful localization within the security zone, is another prerequisite for security functions that require the authentication. The security function is, for example, a function which causes and/or unblocks an engine start and/or the unlocking, e.g. of a central locking mechanism, of the vehicle. A closing device of the vehicle is actuated for unlocking, for example.

The method according to the invention preferably serves for the keyless activation of the at least one security function of the security system, in particular of an access system, of the vehicle, preferably a motor vehicle and/or a passenger car and/or a truck and/or an electric vehicle and/or a hybrid vehicle.

In addition, it is advantageous if the first and/or second communication between the identification transmitter and the vehicle is effected in an encrypted and/or forgery-proof manner, wherein preferably the data being transferred through the communication and/or of the distance information are encrypted. Preferably, besides an encryption and/or forgery-proof communication, a further encoding of the data and/or of the distance information is effected. Preferably, the term "encryption" of e.g. the data and/or a "forgery-proof" transmission particularly relates to a security function for the prevention of an intentional manipulation of the transmission or data. Hereby, in particular, the terms "encryption" and "forgery-proof" are delimited from other encoding and/or control and/or error correction methods for the prevention and/or recognition of faulty transmissions (due to transmission errors such as noise). Preferably, the terms are also delimited from encodings that are (exclusively) used to enable data transmission (character encoding, multiplexing, spreading code, etc.), in particular if they are only used for transmission and not for protection against manipulation. An intentional manipulation here particularly relates to the unauthorized intentional alteration of the data transmission caused by a person.

Furthermore, it is conceivable that the monitoring includes at least the following step:

emitting an initiation signal, e.g. of a LF—(Low frequency) or HF—(High frequency) signal, in particular cyclically and/or upon a detected approach (e.g. by means of a capacitive sensor of a door handle or the vehicle), preferably by LF or HF polling.

Alternatively or additionally, it can be provided that the monitoring includes the evaluation (e.g. of the measuring data) of a sensor of the vehicle and/or of a door handle for the detection of an approach, e.g. the evaluation of at least one proximity sensor such as a capacitive sensor and/or a camera sensor. Likewise, the approach can be detected, for example, in that a communication in a communication field is detected, wherein the communication field is generated by the communication device of the vehicle around the vehicle. The distance determination and/or authentication can, for example automatically, be triggered by the detection of the approach, and/or triggered manually (e.g. by pushing a button). As a condition for the triggering (initiating) of the distance determination, can be another result (such as the manual actuation of the ID transponder or a successful verification), for example besides the detected approach. Furthermore, it can be provided that, e.g. in order to detect the approach, the initiation signal (e.g. as a wake-up signal) is received and/or evaluated by the ID transponder and/or a polling signal and/or a reply signal is sent back to the vehicle in response to the receipt. For example, the polling signal or the reply signal is sent via the same type of communication with which the initiation signal has been received by the ID transponder (e.g. HF or LF). Alternatively or additionally, the polling signal and/or the reply signal or another reply signal or another polling signal is sent by the ID transponder via UWB. It is also conceivable that, as a reaction to the receipt of the initiation signal by the ID transponder, both a reply signal (e.g. via LF or HF, in particular for verification) and, simultaneously or delayed, a polling signal (e.g. via UWB, e.g. for distance determination) is emitted by the ID transponder. Subsequently, in particular, a receipt of the polling signal and/or the reply signal by the communication device of the vehicle is effected. The initiation signal preferably includes information such as data, e.g. about the vehicle and/or the security system and/or information about the authentication method, which can be evaluated by the ID transponder. Furthermore, it is also possible that the initiation signal is sent not before the approach has been detected, i.e. e.g. upon detection of a corresponding signal of a proximity sensor.

The communication type (communication technology) LF particularly relates to a transmission of signals in the long-wave frequency range, e.g. in the frequency range of 0.148-0.283 MHz and/or in a range of 20 kHz and/or 125-130 kHz. The communication type HF particularly relates to a transmission of signals in the shortwave frequency range, e.g. in a frequency range of 3.95 to 26.10 MHz. The communication type Bluetooth particularly refers to a transmission of signals in the frequency range of or in the range of approximately 2.4 GHz. The data transmission rate is no more than 721 kBit per second, for example. Furthermore, the Bluetooth communication type can also be configured as a Bluetooth Low Energy (also called: Bluetooth Smart).

In particular, Bluetooth also means Bluetooth Low Energy in the scope of the invention.

For example, the monitoring can be effected in such a way that first the monitoring takes place, and the approach is detected when the initiation signal is answered by the ID transponder by the emission of a polling signal and/or a reply signal. Based on the received reply signal, for example, the distance determination can readily be made, since the communication (sending the initiation signal, in particular as the polling signal, and sending the reply signal) can take place, e.g. via the same type of communication (such as UWB) between the communication device of the vehicle and the transceiver device of the ID transponder.

According to another advantage, it can be provided that the monitoring is effected only when an approach of the ID transponder has previously been detected, and in particular that the ID transponder has entered into a LF and/or HF (communication) field, e.g. into a first and/or second security zone, which is generated by the vehicle in a cyclic manner, for example. In particular, it is conceivable that an interface with high energy consumption, such as a UWB interface, e.g. a first or second communication unit and/or first or second transceiver unit is activated only when the approach has been detected and/or the ID transponder is detected in the first or second security zone. This allows increasing the battery life of the ID transponder significantly, for example.

It is also conceivable that a verification is done based upon the polling signal or the reply signal received (by the vehicle or the ID transponder) (e.g. whether the ID transponder is situated in the security zone can be determined by evaluating the distance information in order to exclude manipulation of the authentication). The verification can, for example, be done by the distance determination and/or the evaluation of an authentication information and/or by the evaluation of a signal property, such as signal strength, wherein the authentication information is transmitted, for example, from the ID transponder via the polling signal or the reply signal. Subsequently, it is conceivable that for the distance determination, the vehicle (e.g. the communication device) and/or the ID transponder as a sender emits a polling signal and/or a reply signal, e.g. via UWB.

The distance determination preferably occurs by a time-of-flight analysis. For the distance determination, it is necessary here, for example, that, for the determination of the signal transit time, a polling signal (in particular including a polling information) is emitted by the sender via the communication and received by the receiver and, subsequently, another signal, e.g. the reply signal (in particular including a reply information), is emitted by the receiver of the polling signal and received by the sender of the polling signal. The signal transit time can be determined based upon the temporal duration between the sending of the polling signal (ping) and the receipt of the further signal or the reply signal (pong). In particular, the polling and/or reply and/or further signals are transmitted via UWB, wherein the information and/or the data of the communication are preferably transmitted in an encrypted manner. Preferably, all data transmitted via HF and/or LF and/or UWB and/or via the communication are transmitted in an encrypted manner.

Particularly preferably, a first communication, in particular UWB, is used in addition to the second communication, in particular HF and/or LF and/or Bluetooth communication, wherein preferably the first communication and the second communication can take place simultaneously. In particular, it can be provided that first (e.g. in the localization of the ID transponder in a first security zone) only the second communication is activated, and the first communication is activated only upon a further approach of the ID transponder (e.g. upon localization in the second security zone). The first communication can support the second communication here, and/or entirely or at least partially replace it, for example in relation to the authentication and/or distance determination, so that the security can be increased by the use of UWB, for example, and the energy consumption is optimized by the switching between the first and second communication.

It is also conceivable, that, in order to increase security further, the distance determination is performed multiple times for verification before an authentication is effected. The distance determination signals (i.e. the polling signal and the reply signal sent thereupon, i.e. ping and pong) are to that end transmitted multiple times, i.e. at least two times, and in particular at least three times or four times, between the vehicle and the ID transponder, before an authentication is carried out.

Preferably, it can be provided that the distance determination signals for distance determination are transmitted via UWB and the authentication data for authentication are transmitted via LF and/or Hf or another radio connection between ID transponder and vehicle, which is different from UWB. As a result, cost-effective existing authentication systems of the vehicle can be used, and security can be increased by a highly-precise distance determination and localization of the ID transponder by means of UWB at the same time. The precision and/or resolution of the localization by means of UWB is e.g. at least 1 cm or at least 4 cm or at least 10 cm or at least 20 cm.

Advantageously, it can be provided in the scope of the invention that the UWB communication and/or the first communication is activated only when a verification successfully took place based by means of the communication signals of the second communication (e.g. HF or LF). The successful verification includes, e.g. a data exchange and/or the exchange of authentication information and/or a first distance determination by the evaluation of the second communication. Subsequently, for example, if the verification has been successful (e.g. when localizing the ID transponder in the first or second security zone), the first communication can be activated and/or also a second distance determination can take place (e.g. more precisely by evaluation of the first communication, such as UWB). In particular, the first communication is more energy-consuming than the second communication. This provides the advantage that the secure, but very energy-consuming first communication has to be turned-on only when a verification based upon the second communication could already be effected.

It can be particularly preferably in the scope of the invention, if a transmission of authentication information, such as authentication codes, for the activation of the security function and/or determination of the security information are transmitted via the first communication, in particular UWB, or both via the first and the second communication. Just as well, a disturbance detection device of the ID transponder and/or of the vehicle can be provided, and upon detection of a disturbance of the second communication initiate the transmission of the authentication information (instead by using the second communication) via the first communication (e.g. via UWB). Such a disturbance exists, for example, if the vehicle as an electric vehicle is charged via an induction charging process, so that LF communication is disturbed, for example.

Furthermore, it is conceivable that after the sending of the polling signal via a first communication unit and/or a first transceiver unit, the first communication unit and/or the first transceiver unit is turned-off after a certain period of time, if a receipt of a corresponding reply signal (e.g. for the determination of the signal transit time) is not detected within this time period. This enables further energy savings. This time period is e.g. no more than 1 ms or no more than 10 ms or no more than 100 ms or no more than 1 s or no more than 5 s and/or is configured to be adjustable.

In the scope of the invention, features described in conjunction with the first communication naturally also apply in conjunction with the second or a further communication, and vice versa. Thus, the second communication can also be configured as the UWB communication, and the first communication can be configured as the HF or LF or Bluetooth communication, for example.

Furthermore, it can be provided in the scope of the invention that a time-of-flight analysis is performed for the distance determination according to step a), wherein at least one of the following steps is provided:

emitting a polling signal and/or a polling information via the communication, in particular via the communication signal, e.g. via UWB, preferably by a communication device of the vehicle, in particular by a first communication unit of the communication device or by a transceiver device, preferably by a first transceiver unit, of the ID transponder, receiving the polling signal and/or the polling information, preferably by a transceiver device of the identification transmitter, or by the communication device of the vehicle, emitting a reply signal and/or a reply information via the communication, in particular via the said or via another communication signal, i.e. e.g. via UWB, as a reply to the polling signal or the polling information, preferably by the transceiver device or by the communication device of the vehicle, receiving the reply signal and/or the reply information, preferably by the communication device or by the transceiver device of the ID transponder, determining a signal transit time, in particular between a first time of the emission of the polling signal and/or the polling information and a second time of the receipt of the reply signal and/or the reply information, determining the distance information based upon the signal transit time.

In the scope of the invention, a "signal", in particular the term "communication signal", relates to at least one information or at least part of a data sequence, such as a "ping signal" and the associated "pong signal" as a reply signal, which is transmitted via radio, for example, or, as an alternative or in addition, at least one (electromagnetic, in particular radio) signal (in the physical sense) is meant, the properties of which, e.g. the signal strength and/or signal transit time, can be evaluated. In particular, the data sequence includes at least one information, such as a sent (polling information) and a received (reply information), which are transmitted one after the other, in order to be able to determine the signal transit time of the signal (or likewise make an estimation).

It can also be enabled that the ID transponder is the sender of the polling signal and the vehicle and/or the communication device is the receiver of the polling signal, for the distance determination. Preferably, the vehicle and/or the communication device is the sender of the reply signal and the ID transponder (in particular a transceiver device of the ID transponder) is the receiver of the reply signal. Preferably, the ID transponder conducts the determination of the distance information, and subsequently sends e.g. the determined distance information to the vehicle, e.g. via the communication, in particular via UWB, and/or via LF and/or HF or another radio connection.

Preferably, it is provided that a (e.g. first and/or second) communication between the identification transmitter and the vehicle takes place, in particular via a radio connection, preferably by means of a wideband communication method, e.g. ultra-wideband. The radio signals transmittable and/or transmitted via the communication or radio connection include e.g. at least one of the following signals:

an initiation signal, e.g. a wake-up signal,
an authentication signal,
data of a data transmission,
distance information,
comfort information (e.g. for the control of a vehicle lighting system), user information about the user of the vehicle and/or user-specific vehicle (pre)settings,
navigation information,
GPS information (Global Positioning System),
encryption information (e.g. an encryption code),
signals for distance determination, in particular a polling information and/or a reply information.

These signals can also be encrypted and are transmitted e.g. by means of ultra-wideband technology (UWB), and are thus formed in particular as UWB signals.

In particular, for communication (e.g. for the initiation), a first signal transmission occurs via a first communication, and subsequently (e.g. as a reply) a second signal transmission occurs via a second communication, wherein the radio frequencies and/or the communication type of the first communication and the second communication are different. Furthermore, it can be provided that the communication enables a localization (e.g. of the ID transponder). Thus, the communication, in particular according to the UWB technology, enables an encrypted and/or highly-precise and/or interception-proof localization of for example the ID transponder. The localization is preferably based on a "time-of-flight" measurement, in particular under "line-of-sight" conditions, wherein the speed of light and/or the signal speed of the communication is considered for the localization and/or evaluation. Particularly preferably, localization is effected with a resolution and/or preciseness in the range of 1 cm to 100 cm, preferably 10 cm to 50 cm, particularly preferably 5 cm to 15 cm. The "line-of-sight" conditions particularly means that the transmission of the radio signals (for example only or exclusively) takes place with and/or in direct visual contact between transmitter and/or receiver. For example, security can be increased in that the (first and/or second) communication takes place only under "line-of-sight" conditions.

Transmitter and/or receiver of the (first and/or second) communication are preferably a communication device and/or detection device of the vehicle as well as a transceiver device of the ID transponder. The detection device is preferably a distance measuring device of the vehicle, i.e. a device that allows the determination of the distance (e.g. between ID transponder and vehicle) and/or the receipt of the distance information (directly). In particular, the communication device and/or detection device is connectable to a processing device electrically and/or via radio, wherein e.g. further steps for distance determination and/or an evaluation of the distance determination or distance information take place via the connection and/or the processing device. The communication device and/or detection device and/or the processing device and/or the ID transponder preferably includes electronics components, e.g. integrated circuits and/or microprocessors and/or ASICs (application-specific integrated circuits) and/or a digital signal processors (DSP) and/or correlation receivers and/or the like, in order to evaluate and/or generate the distance information by means of arithmetic information.

Preferably, the vehicle is configured as a motor vehicle or passenger car, or as a truck or as an electric vehicle or as a hybrid vehicle. The security system preferably includes an access system and/or a central locking mechanism and/or a locking device and/or a closing system of the vehicle and/or is electrically connected to the electrically-controllable door locks and/or closing elements for example for automatically opening the trunk lid or for locking the doors of the vehicle. Preferably, the vehicle comprises a control unit, which is connected to the onboard electronics. The control unit can perform the authentication process or the authentication request with the ID transponder. Here, the control unit can be directly arranged in the locking device, or in another relevant place of the vehicle. In particular, provision is made for that in the case the authentication may be negative, no change of the state of the locking device is effected. This effectively prevents that unauthorized persons bring the locking device into the unlocked state. Advantageously, the access control system is connected to a closing system, which can, inter alia, lock and unlock the vehicle doors, rear trunk lid, and the like. Upon a positive authentication, the vehicle door and/or the trunk lid are unlocked, so that the user (operator) can actively open the door, trunk lid.

Furthermore, it is conceivable that the localization and/or distance information can be evaluated by a further external device. In particular, it can be provided that the ID transponder and/or the vehicle includes an interface, which can be connected to the external device electrically and/or via radio, wherein a (data) transmission, in particular of the distance information or an information dependent thereupon, occurs in particular via the interface. Preferably, the transmitted (distance) information is used to display or output information to a user of the external device based thereupon, which information enables finding the ID transponder.

Preferably, the first and/or second communication is carried out by means of the ultra-wideband (UWB) technology. Communication by means of UWB is based in particular on the technical thinking, that the channel capacity increases linearly with the bandwidth of the transmitter signal and logarithmically with its power. For example, in communication technologies such as Bluetooth, the available bandwidth is narrow and constant. By contrast, UWB uses a very wide frequency range, in order to enable high channel capacity at reduced transmission power. This provides the advantage that a data transmission can be effected at a very low power consumption through the (UWB) transmitter. The maximum power output of a UWB transmitter, such as the (first and/or second) communication unit, is 1 mW, for example.

In particular, a multiplexing method, preferably a frequency multiplexing method such as an Orthogonal Frequency Division Multiplexing (OFDM) and/or a code multiplexing method such as a Code Division Multiple Access method, in particular a Direct-Sequence-Code Division Multiple Access (DS-CDMA) is employed for communication, e.g. for the first and/or second communication, in particular for the data transmission. Preferably, pulse-type signals are wirelessly transmitted for the transmission of signals and/or data. Here, a shifting of the pulses by means of (pseudo)random values is effected, wherein then (UWB) transmitters and (UWB) receivers consider the same values for the shift. Preferably, prior to or at the start of the transmission of signals and/or data, a temporal synchronization of (UWB) transmitter and (UWB) receiver is effected. Transmitter and/or receiver, in particular UWB transmitters and/or UWB receivers can be and/or include, for example, a (first and/or second) communication unit and/or the associated communication interfaces and/or a communication device (of the vehicle) and/or a transceiver device and/or a (first and/or second) transceiver unit (of the ID transponder). For the evaluation of the received signal, the (UWB) transmitter and/or the (UWB) receiver includes e.g. electronic components such as comparators for the comparison of received pulses and/or correlation receivers and/or integrated circuits and/or microprocessors and/or electronic components for performing a Fast Fourier Transformation.

The transmission of a distance information and/or the communication of the ID transponder with the vehicle and/or the security system of the vehicle, in particular the data transmission of security-relevant data, and/or the distance determination, in particular by means of UWB, preferably occurs in an encrypted manner. To that end, cryptographic security mechanisms such as RSA are employed, which, for example, include connection keys and/or authentication mechanisms and/or the use of secret (private) and public keys and/or a symmetric and/or asymmetric cryptographic system and/or a hybrid encryption. Thus, the advantage that a secure and reliable transmission is possible, is achieved.

The communication via the wideband communication method, preferably via UWB, and/or by means of the wideband communications signal, is preferably effected via at least one large frequency range, preferably with a (total) bandwidth of (at least) 500 MHz to 900 MHz and/or (at least) 3.5 GHz to 10 GHz and/or at least 5 GHz and/or at least 2 GHz and/or at least 1 GHz and/or at least 500 MHz and/or at least 40% and/or at least 30% and/or at least 20% and/or at least 10% of the arithmetic mean value of the lower and upper limit frequency of the used frequency band. The total bandwidth can be composed of the bandwidth of the individual frequency bands, which are commonly used for communication, or related to the bandwidth of one single frequency band used for communication. For example, the frequency range can be in the range from 0 to 40 GHz, in particular 500 MHz to 900 MHz, preferably 3.5 GHz to 10 GHz, preferably 3.5 GHz to 6.8 GHz, preferably 20 MHz to 11 GHz, particularly preferably 30 MHz to 10.6 GHz, and/or 22.0 GHz to 26.7 GHz and/or 1 MHz to 12.4 GHz and/or essentially 700 MHz can be used. Furthermore, it can be provided that the maximum mean value of the spectral power density for the (UWB) communication is in the range between −90.0 dBm/MHz and −20.0 dBm/MHz, preferably maximally −41.3 dBm/MHz. The data transmission rate for the data transmission is preferably at least 1 Mbit/s or at least 4 Mbit/s or at least 6 Mbit/s, in particular no more than 6.8 Mbit/s or 10 Mbit/s. Thus, a quick and interference-proof transmission is possible.

Preferably, pulses are sent for the (in particular UWB) communication. The distance between the pulses can expediently be greater than the pulse length by magnitudes. It is conceivable here that a pulse width modulation technique and/or a pulse phase modulation technique are used for the data transmission. This ensures a quick, reliable and/or secure data communication.

It can further be provided that according to the UWB communication, also the distance determination is effected by means of a distance measurement such as a time of flight analysis of a (UWB) radio signal. In particular, a frequency range from 22.0 GHz to 26.6 GHz can be used here. The center frequency can e.g. be in the frequency range from approx. 1 GHz to 15 GHz, and a frequency bandwidth of at least 500 MHz can be provided.

Furthermore, it can be possible in the scope of the invention that the transceiver of the ID transponder receives a signal from the vehicle (e.g. from an onboard security system and/or the communication device) via a radio connection, and preferably is or can be connected to a processing unit such that the signal received via the radio connection by the transceiver device, in particular a wake-up signal and/or an information for distance determination, can be evaluated by the processing unit. It is conceivable here that the radio connection is a first radio connection of a first communication (such as a UWB radio connection) of a first transceiver unit and/or a second radio connection of a second communication (such as a LF and/or HF radio connection) of a second transceiver unit of the transceiver. In particular, the transceiver and/or the processing unit can be woken-up because of the receipt of the signal. In this case, waking-up particularly relates to the activation of functions and/or components of the ID transponder or also the change from the sleep mode to the operating mode, e.g. with a higher energy consumption. The (wake-up) signal can, in particular, trigger communication of the ID transponder with the security system.

In particular, the (vehicle-sided) security system can comprise an access system (e.g. central locking mechanism for the vehicle doors), which has an Active-Keyless-Entry, Passive-Keyless-Entry or Keyless-Go functionality. The security system serves for example for the keyless activation of at least one security function, in particular an access system of the vehicle, in particular motor vehicle. To that end, in particular an authentication process and/or a distance determination (with positive result) initiated by the (wake-up) signal or following the receipt of the (wake-up) signal is required for activation. The positive result relates, for example, to a successful code verification and/or code conformance in the authentication and/or a distance of the ID transponder to the vehicle determined by the distance determination, which must be less than a maximum distance. The authentication process allows activating functions, in particular security functions, of the security system of the vehicle, e.g. an opening or closing of a closing device of the vehicle, e.g. also doors and lids in the rear and/or side region of the vehicle, a starting of the engine/motor or an activation or deactivation of the immobilizer system.

The (wake-up) signal is sent, for example, by at least one onboard communication device and/or detection device of the security system. To that end, e.g. communication parts, in particular antennas, can be provided in different areas of the vehicle, e.g. outside the vehicle, in the interior space, on the doors, in particular the door handles, on the roof, the rear side, and/or the side region of the vehicle, or in the trunk. In the event that the (wake-up) signal is transmitted via a UWB and/or LF radio frequency, the range is strongly limited and is also strongly attenuated by the vehicle body and/or (completely) shielded-off. This e.g. also allows a distance determination. Furthermore, this also allows that a device receiving the (wake-up) signal, (e.g. an ID transponder), can be localized inside or outside the vehicle, and preferably the localization inside the vehicle can be delimited from the localization outside the vehicle. As a support, it is also possible that another method for distance determination is used, such as an evaluation of the signal strength or signal transit time ("time of flight"). After the localization and/or the receipt of the signal and/or the distance determination (in a positive result), e.g. an authentication process is initiated, which particularly includes the sending of a reply signal to the security system, wherein the reply signal can contain e.g. a code (access code) for identification verification. The reply signal is received and evaluated e.g. by the onboard communication device or by another onboard electronics. Preferably, a UWB and/or LF antenna which is capable of receiving the (wake-up) signal from the vehicle is provided in the ID transponder, in particular in the transceiver device of the ID transponder and/or the (first and/or second) transceiver unit. An antenna of the ID transponder, e.g. a UWB and/or LF antenna, can be provided for the receipt, and a separate or the same antenna can be provided for the sending of signals.

Furthermore, preferably communication parts can be provided, which include in each case one or multiple antennas, in particular UWB antennas. It is conceivable here that for the (in particular UWB) communication, a MIMO (Multiple Input Multiple Output) method is provided, so that multiple sending and/or receiving antennas are used. For example, a signal processing for the signals received by the antennas is provided. Preferably, the communications parts are arranged on the vehicle in such a way that an implementation of a MIMO method is enabled.

It is also conceivable that the communication part, in particular the respective antenna, is formed in such a way that the type of construction and/or the antenna parameters and/or the antenna type of construction and/or the length and/or the extension of the antenna is adapted to the UWB method and/or the (in particular UWB) bandwidth used for the communication. Thus, it is possible that at least one of the respective antennas is configured as a linear antenna and/or as a flat-top antenna and/or as an antenna array. In particular, the length of the antenna is adapted to the center frequency and/or pulse length used for communication. The antenna type of construction can be, in particular, a UWB-specific construction type, e.g. a Rugby-Ball antenna, or in a Tapered Slot construction type.

Preferably, the communication part, in particular the antenna, can comprise a planar metal structure and/or at least one waveguide. Furthermore, it is conceivable that the communication part/the antenna is configured in such a way that a sending and/or receiving of high-frequency signals can be performed. The antenna can be formed as an omni-directional antenna, for example. Likewise, the communication part or the antenna can have a directivity and include, to that end, at least one dipole element, in particular a three-dimensional dipole element.

Further preferably, a data transmission can be effected in such a way that a UWB specific modulation type is used. Such modulation type is, for example, a pulse width modulation and/or a pulse phase modulation. Furthermore, it is conceivable that the information of the data transmission is modulated onto a communication signal by means of an encoding of the polarity and/or the amplitude and/or the direction of pulses (sent by the communication). To that end, also orthogonal pulses can be used, for example.

Preferably, a detection device and/or the transmission system are provided vehicle-sided, i.e. in or at the vehicle. The mobile ID transponder is usually not fixedly arranged in or at the vehicle, unless it has been inserted into a lock or into a corresponding receptacle by its user. Otherwise, the mobile ID transponder can be carried along, no matter where it is located with respect to the vehicle.

BRIEF DESCRIPTION OF THE SEVERAL VIEWS OF THE DRAWINGS

Further advantages, features and details of the invention result from the following description, in which exemplary embodiments of the invention are described in detail with reference to the drawings. Here, the features mentioned in the claims and in the description can be essential to the invention individually or in any combination. The Figures show in:

The same reference characters are used for the same technical features even in different exemplary embodiments throughout the following Figures.

DESCRIPTION OF SPECIFIC EMBODIMENTS OF THE INVENTION

Figure 1:
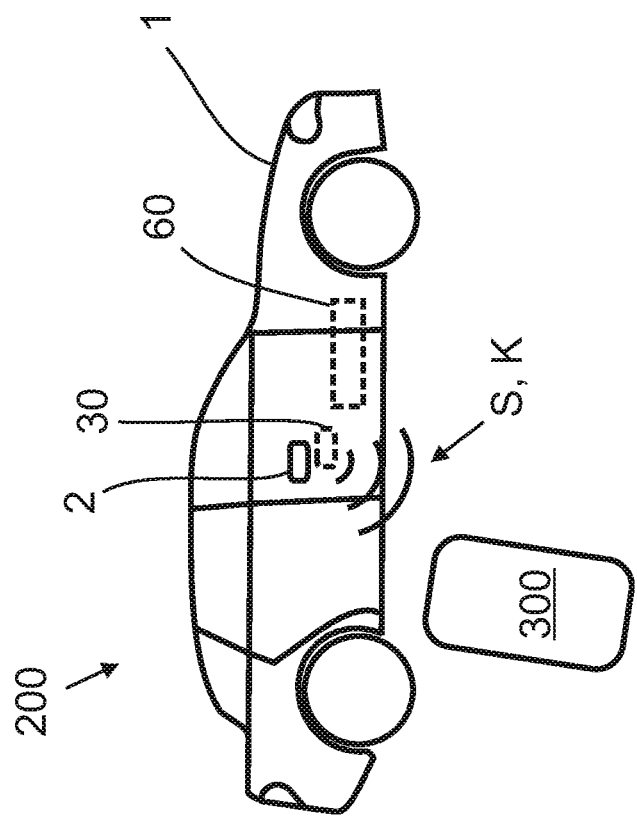
FIG. 1 a schematic side view of a vehicle.

FIG. 1 schematically shows a vehicle 1 in a side view. In this case, the vehicle 1 includes at least parts of a security system 200 according to the invention. Thus, a communication unit 30 as well as a processing device 60 is provided on and/or in the vehicle 1. Optionally, a proximity sensor 2 for the detection of an approach of a user of the vehicle 1 is arranged in the area of the door handle of the vehicle 1. The communication unit 30 serves for the communication with a mobile identification transmitter 300. To that end, a communication field K is generated by the communication unit 30, wherein information is transmitted wirelessly via radio waves of the communication field K. For the communication with the mobile identification transmitter 300, communication signals S are received and/or sent by the communication unit 30, for example, preferably via the communication field K. In particular, the communication field K (as a UWB communication field K) serves for the transmission of UWB communication signals S, wherein in this case, the communication signal S uses radio waves (of the communication field K) which are in an especially wide frequency spectrum. Thus, the UWB communication signals S preferably include an especially wide frequency spectrum. Preferably, a frequency range with a bandwidth of at least 500 MHz is used for the communication field K and/or for the communication signal S. Accordingly, the communication signal S can be referred to as a wideband communication signal S.

Figure 2:
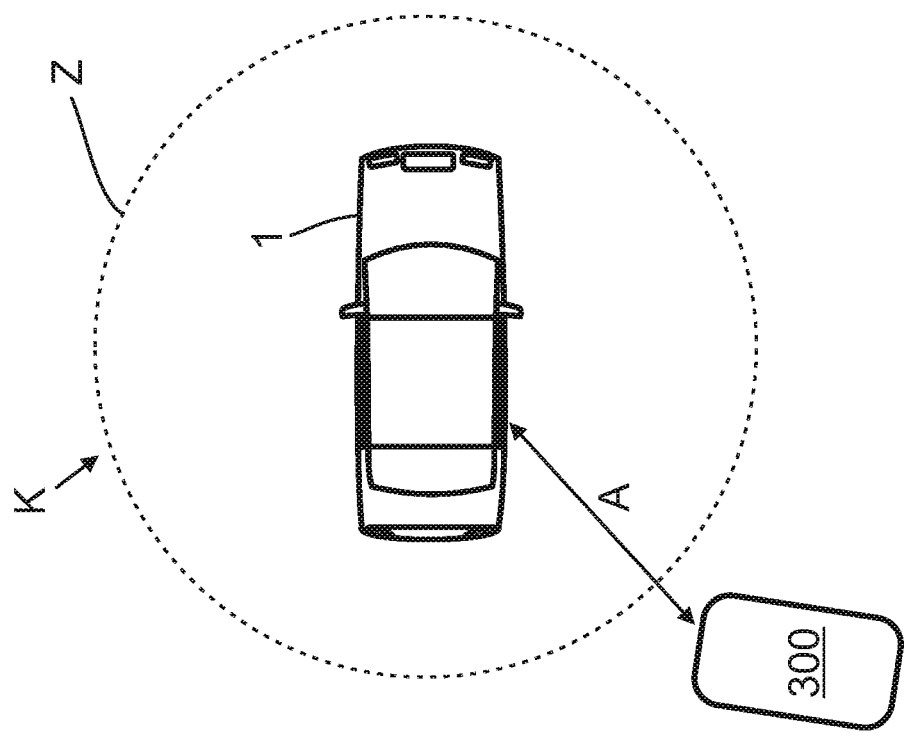
FIGS. 2, 3 and schematic views of a vehicle in a plan view.

At least one security zone Z can be provided around the vehicle, wherein the extension of the security zone Z is particularly defined dependent upon the communication field K and/or a communication of the vehicle 1. This is schematically shown in FIG. 2, wherein the circular shape of the communication field K and/or of the security zone Z merely serves for illustration purposes. In reality, the range and/or extension of the security zone Z can likewise extend in an irregular manner, depending on the surroundings of the vehicle 1.

The security zone Z and/or different security zones Z of the vehicle 1 can be determined or defined in different manners. Thus, the range of communication via the communication signal S is, in particular, determined by the extension of the communication field K. Depending on this physical limitation of the range, the security zone Z can be defined in accordance with a first possibility. In this case, a distance determination can be used in order to perform a determination of a distance A between the identification transmitter 300 and the vehicle 1. When the security zone Z is determined by the maximum reach of the communication field K, it can be assumed for the distance determination, e.g. in a lack of communication, that the identification transmitter 300 is located outside the security zone Z. In this case, the distance determination is performed based upon the maximum communication range. Alternatively or additionally, it can be provided in accordance with a second possibility that the security zone Z is defined as a maximum distance to the vehicle 1, which is, for example, within the maximum communication range. Now, the communication is actively performed and received signals are evaluated for the distance determination. To that end, the distance determination must determine distance information about the actual distance A of the identification transmitter 300 to the vehicle 1. This can take place by a time-of-flight analysis of the communication signal S, for example. The evaluation of the communication signal S for the distance determination corresponds, in particular, to an evaluation of the communication between the vehicle 1 and the identification transmitter 300 and/or to an evaluation of the communication field K.

The distance determination and/or an evaluation of the distance information thus obtained by a processing device 60 of the vehicle 1 allows a specific localization of the identification transmitter 300 relative to the security zone Z. The distance determination is initiated, for example, when an approach of the identification transmitter 300 is detected by a proximity sensor 2 of the vehicle 1. Alternatively or additionally, the distance determination can also be initiated as soon as a communication of the vehicle 1 with the identification transmitter 300 is enabled and/or a link has been established for communication. Furthermore, the distance determination can also be initiated in that an entry of the identification transmitter 300 into a certain security zone Z is monitored, and the initiation of the distance determination takes place during or after entering the said zone.

Figure 4:
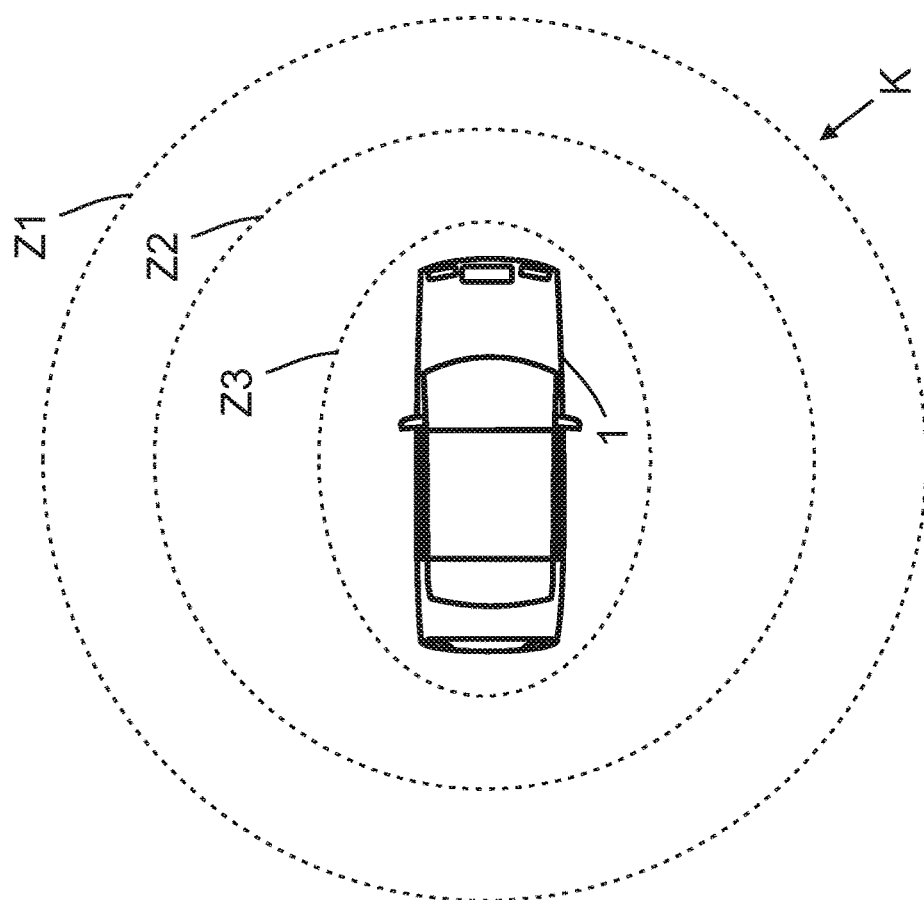
Figure 3:
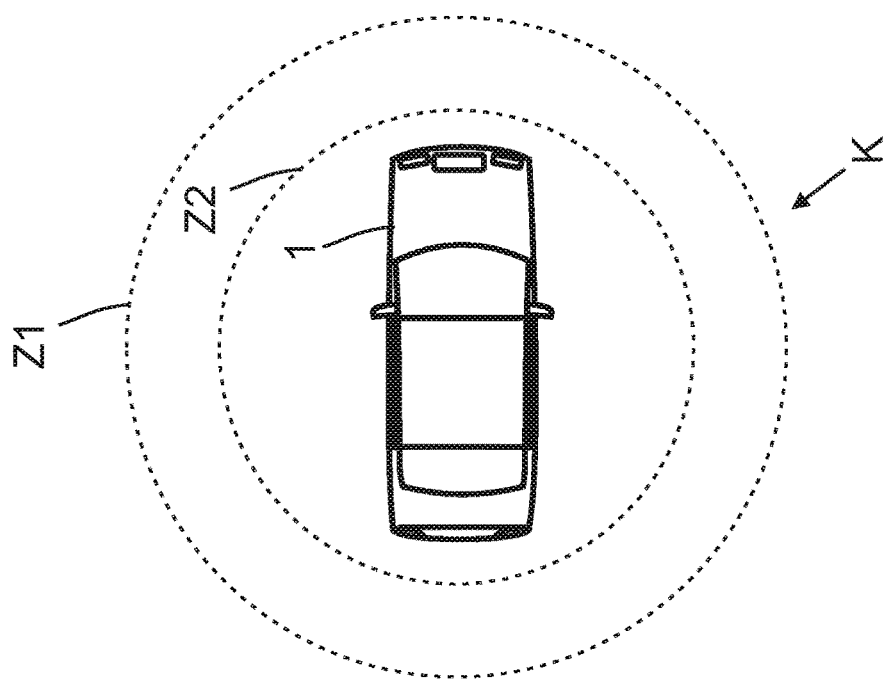

FIGS. 3 and 4 schematically show that likewise multiple security zones Z can be provided. For example, a first security zone Z1 and a second security zone Z2 as well as, as the case may be, a third security zone Z3 and/or further security zones Z can be provided at different distances to the vehicle 1. It is conceivable here that the third security zone Z3 having the smallest distance to the vehicle 1 forms a comfort zone Z3, wherein a localization of the identification transmitter 300 within the comfort zone Z3 (in particular merely) causes the activation of comfort functions. Such a comfort function is, for example, the activation of a front lighting system of the vehicle 1, which is particularly effected when the identification transmitter 300 enters the comfort zone Z3. Another comfort function is, for example the activation of a vehicle lighting system. The first security zone Z1 extends, in particular, at a greater distance from the vehicle 1 than the second security zone Z2. For example, the identification transmitter 300 is localized in the first security zone Z1 when a second communication is initiated by a second communication unit 32, for example a LF communication between the vehicle 1 and the identification transmitter 300. Here and/or dependent upon a further localization, for example the second communication, and/or in a successful pre-identification of the security system 200 with the identification transmitter 300, a first communication with a first communication unit 31 with the identification transmitter 300, preferably via ultra-wideband, can be initiated. Based upon this first communication, a distance determination can be re-conducted, for example through an evaluation of the communication signal S of the first communication, i.e. of a first communication signal S1. This renewed distance determination can preferably be repeated in a cyclic manner. If, now, a distance A of the identification transmitter 300 from the vehicle 1 is determined, by this renewed distance determination, to be equal to and/or smaller than the distance of the second security zone Z2 from the vehicle 1, a localization of the identification transmitter 300 within the second security zone Z2 is effected. Upon a successful localization of the identification transmitter 300 within the second security zone Z2, an authentication process can be initiated, for example. Now, a renewed distance determination can in turn be made. If, by this distance determination, a distance A of the identification transmitter 300 from the vehicle 1 is determined to be equal to and/or smaller than the distance of the third security zone Z3 from the vehicle 1, a localization of the identification transmitter 300 within the third security zone Z3 is effected. Upon a successful localization of the identification transmitter 300 within the third security zone Z3, a renewed authentication process can be performed and/or a comfort function can be activated and/or an access system of the vehicle 1 can be activated and/or a door and/or a lock of the vehicle 1 can be opened.

Figure 7:
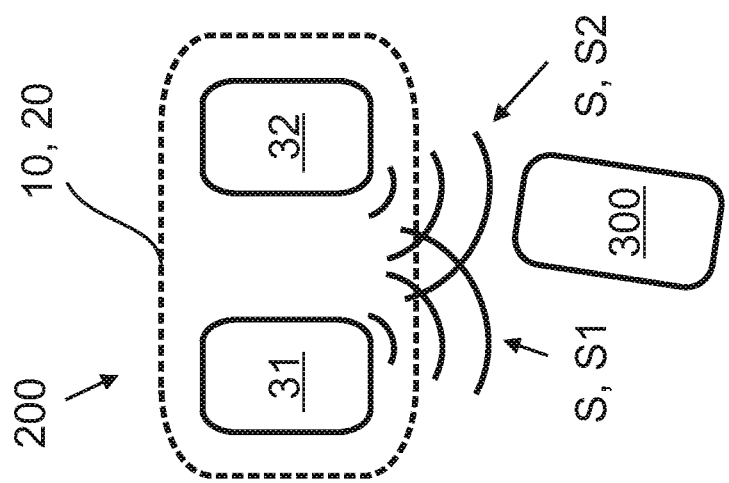
Figure 6:
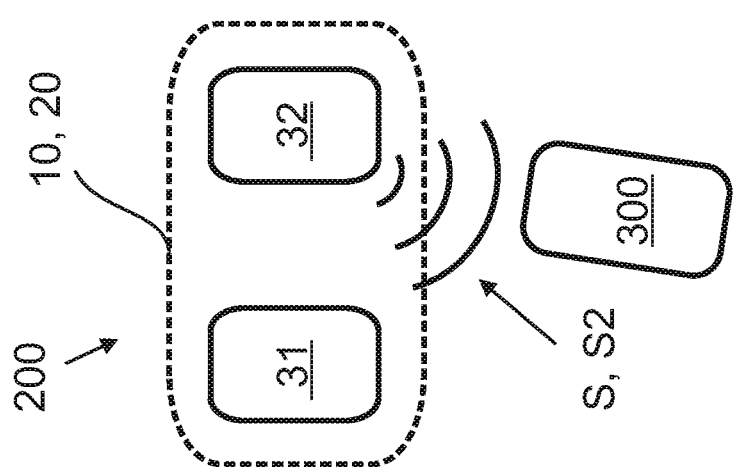
FIGS. 5, 6 and further schematic representations of a security system according to the invention, FIG. 8+9 further schematic representations of a security system according to the invention, FIG. 10 a further schematic representation of parts of a security system according to the invention, FIG. 11 a schematic plan view of a vehicle having a security system according to the invention, and FIG. 12 a schematic representation for visualizing a method according to the invention.
Figure 5:
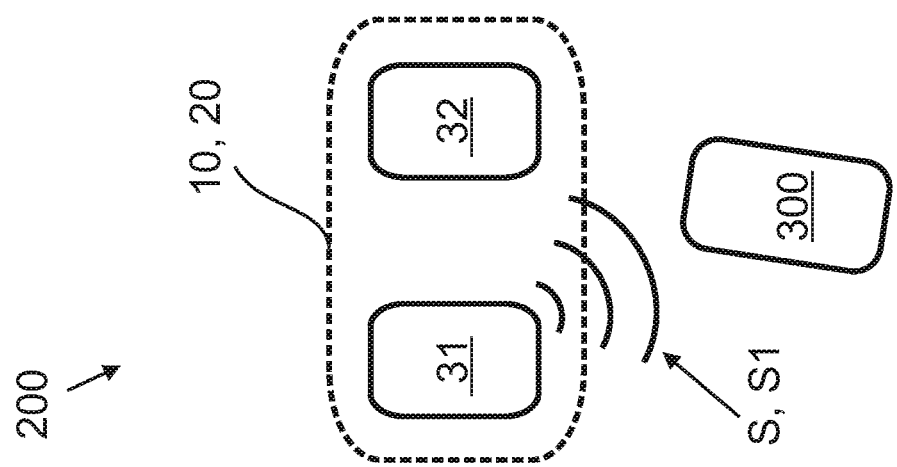

FIGS. 5 to 7 explain this process in a more detailed manner, in particular the first and second communication. The security system 200 includes at least one detection device 10 and/or at least one communication device 20 for performing communication. Here, the communication device 20 can, for example, be at least part of the detection device 10 of the vehicle 1. Thus, the communication device 20 and/or the detection device 10 can be electrically connected to one another, for example, and/or be formed as a (common), in particular electric, component. It is also conceivable that the communication device 20 receives the signals of communication, evaluates them, as the case may be, and particularly performs a distance determination and/or detects the distance information. Thus, the communication device 20 can also form the detection device 10 (or correspond to it), and/or vice versa. The communication device 20 and/or the detection device 10 includes at least one communication unit 30, preferably a first communication unit 31 and a second communication unit 32. The first communication unit 31 serves for a first communication with the identification transmitter 300 and the second communication unit 32 serves for a second communication with the identification transmitter 300.

A first communication signal S1 is used for the first communication, and a second communication signal S2 is used for the second communication. According to FIG. 5, the first communication takes place, for example, via the first communication signal S1 for the distance determination. According to FIG. 6, the second communication can be used via the second communication signal S2, in order to transmit, for example, a wake-up signal to the identification transmitter 300, and/or also perform a distance determination. Just as well, the emission of the wake-up signal and the subsequent monitoring for a reply signal can be considered to be a distance determination (in regard to the maximum communication range, which is used as an indicator for the entry into a security zone Z and/or for the required distance A). According to FIG. 7, a first and second communication is used simultaneously. In this way, for example via the second communication, i.e. via the second communication signal S2, the distance determination can be performed, wherein the result of the distance determination (i.e. the distance information) is verified based on a further distance determination by the first communication with the first communication signal S1. It is also conceivable that an authentication is performed via the first and/or second communication. Furthermore, it can be provided that the first communication is only used in the event that the second communication is disturbed, for example.

Figure 8:
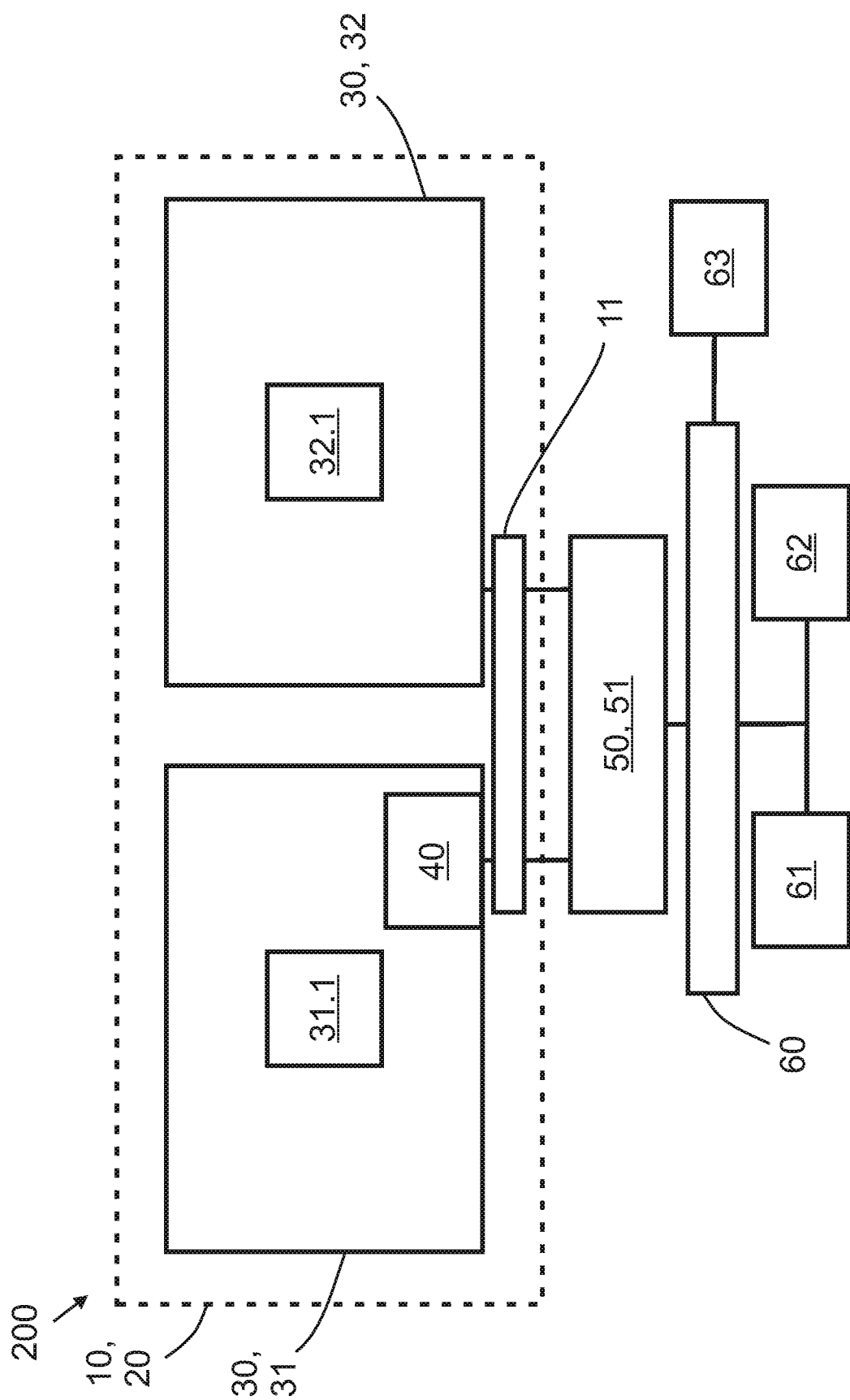
Figure 9:
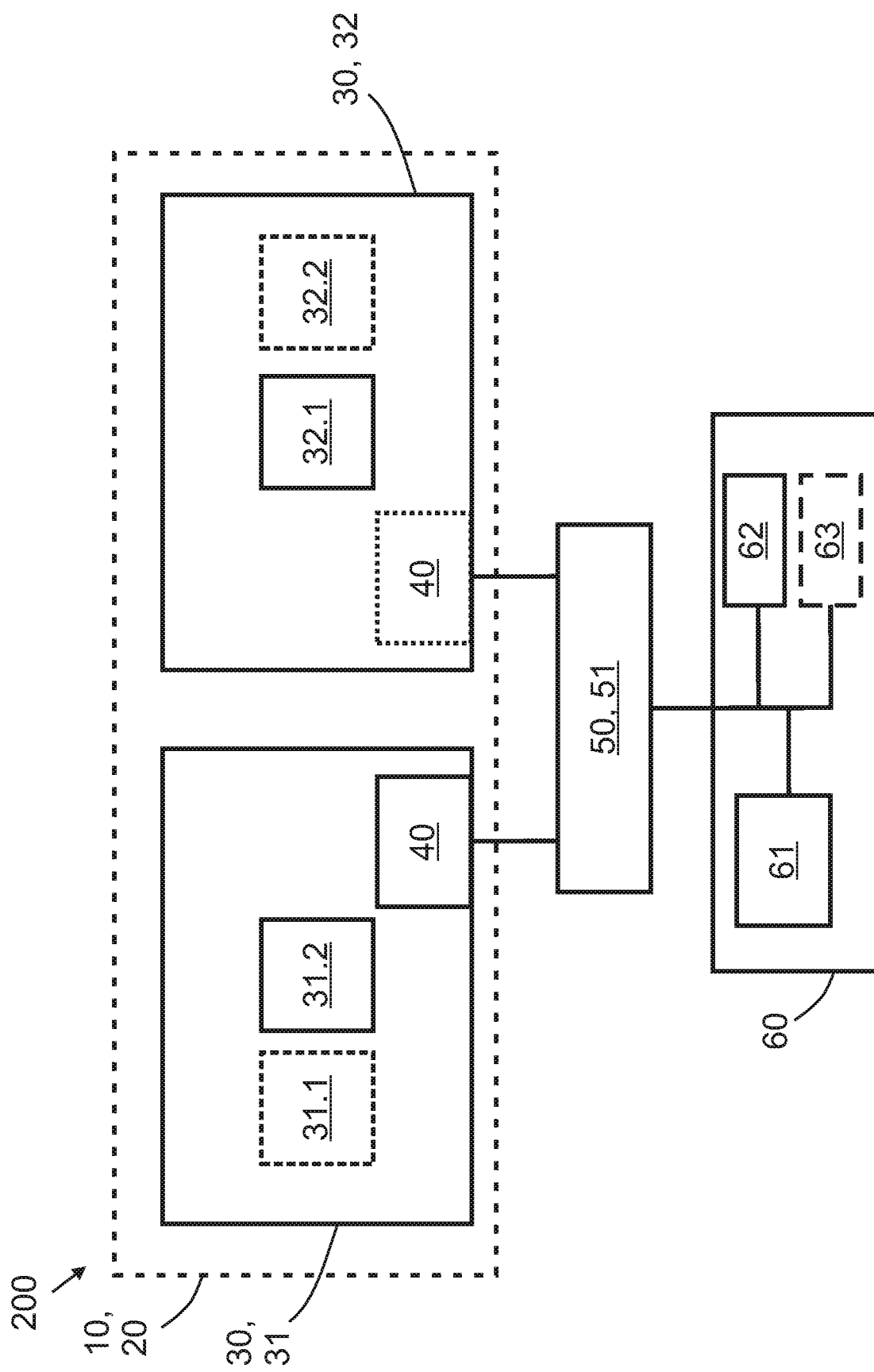

FIG. 8 shows a schematic construction of a detection device 10 and/or a communication device 20 of a security system 200 according to the invention. Here, the detection device 10 and/or the communication device 20 includes at least one communication unit 30, in particular a first communication unit 31 and a second communication unit 32. The first communication unit 31 includes at least one first communication interface 31.1, in particular an ultra-wideband interface and/or a Bluetooth interface. The second communication unit 32 includes at least one second communication interface 32.1, preferably a LF interface and/or HF interface. FIG. 9 shows that optionally the first communication unit 31 may comprise at least one further first communication interface 31.2, preferably a Bluetooth interface. Likewise, the second communication unit 32 can include yet a further second communication interface 32.2, preferably a HF interface and/or a Bluetooth interface. The communication interfaces serve for performing the first and/or second communication via the corresponding communication technology. Furthermore, the communication interfaces can also be electrically connected to corresponding communication parts 35, such as antennas. Thus, the communication device 20 is capable of performing communication, via one or multiple communication technologies, with the identification transmitter 300. In particular, the communication device 20 can of course also only include one single (for example first) communication unit 30, 31 and/or only one single (for example first) communication interface, so that only one single (for example first) communication with the identification transmitter 300 is possible via one single communication technology, for example via ultra-wideband. After that, the information of the communication signals S received from the communication device 20 via the communication parts 35 are transmitted to a processing device 60 of the vehicle 1 via a transmission system 50 of the vehicle 1. The information, such as a distance information, can likewise be transmitted in an encrypted manner here, for example. Optionally, the communication device 20 and/or each (or only one single) communication unit 30 includes at least one encryption device 40 to that end. The encryption device 40 is, for example, formed as an integrated circuit, in particular as a security chip. In the transmission via the transmission system 50, the information is transmitted by at least one transmission station 51 of the vehicle 1. The transmission system 50 is formed as a bus system of the vehicle 1, for example. The transmission station 51 is a bus user of the transmission system 50, for example.

For performing the distance determination, the processing device 60 shown in FIGS. 8 and 9 can be used, which, for example, is configured as a central processing device 60 of a central vehicle electronics of the vehicle 1. Thus, the processing device 60 is, for example, centrally provided in the vehicle 1. The processing device 60 can preferably be arranged in the vehicle 1 in a (delimited) distributed manner and comprise multiple components. Alternatively, it is also possible that the processing device 60 is arranged centrally in the vehicle 1 in terms of space, for example as a single component. The components of the communication device 20 and/or of the detection device 10 can preferably be arranged in the vehicle in a distributed manner, wherein the communication units 30 (and/or the respective communication interfaces) can each be arranged and/or formed separately in the vehicle. Here, it is also conceivable, as an alternative, that the communication device 20 and/or the detection device 10 are arranged and/or formed in the vehicle 1 as a spatially-delimited component and/or are arranged and/or formed in the vehicle 1 in a spatially-delimited manner. Thus, the association of the communication units 30 to the communication unit 20 thus preferably corresponds to a strictly functional (logical) association.

Alternatively or in addition, a distance determination can be performed by a detection/evaluation unit 11 of the detection device 10 and/or the communication device 20. Furthermore, the detection/evaluation unit 11 and/or the processing device 60 comprises, for example, electronic components such as integrated circuits and/or processors to perform the distance determination and/or an evaluation of the distance information. For the evaluation of the distance information and/or for the distance determination, the processing unit 60 particularly comprises an evaluation device 61. In order that the distance information can be evaluated, it must preferably first be decrypted. To that end, the processing device 60 is electrically, in particular electronically, connected to a decryption device 62. As a matter of fact, the evaluation device 61 can optionally perform the decryption itself, so that no decryption device 62 must be provided. It is also conceivable that the processing device 60 is electrically connected to a data storage unit 63, wherein a digital key information for decryption is digitally stored in the data storage unit 63 in a manner readable to the processing device 60 and/or the evaluation device 61. The digital key information is, for example, a cryptographic key. Preferably, the evaluation device 61 and/or the decryption device 62 and/or the data storage unit 63 of the processing device 60 can be arranged on a common circuit board here and/or be electrically connected to one another, as shown schematically by FIG. 9. In this case, the data storage unit 63 is only optionally provided as a separate component, which is illustrated by a dashed line in FIG. 9. Alternatively, the data storage unit 63 can likewise be integrated in the evaluation device 61 and/or in the decryption device 62, for example as a Flash memory.

Figure 10:
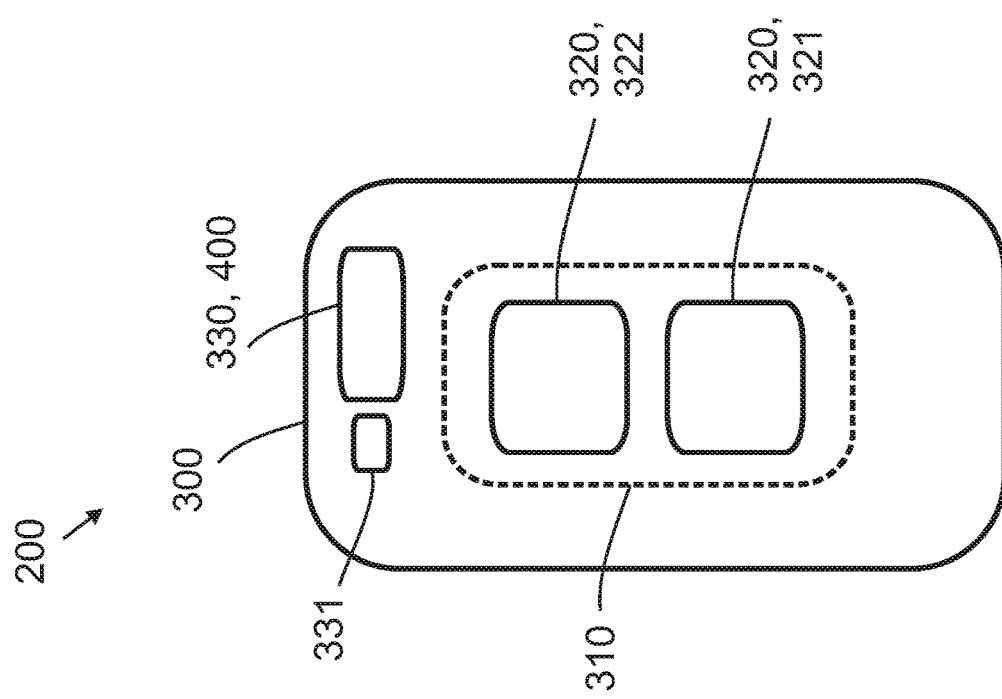

FIG. 10 shows a schematic structure of a mobile identification transmitter 300 of a security system 200 according to the invention. The mobile identification transmitter 300 includes a transceiver device 310, which serves for the communication with the vehicle 1, in particular with the communication device 20. In particular, the transceiver device 310 comprises at least one transceiver unit 320, preferably a first transceiver unit 321 for performing a first communication with the vehicle 1 and a second transceiver unit 322 for performing a second communication with the vehicle 1. Naturally, only one single (for example first) transceiver unit 320, 321 can be provided, so that only one (for example first) communication can be performed. The first transceiver unit 321 is, for example, configured for performing an ultra-wideband communication, and/or the second transceiver unit 322 is configured for performing HF and/or LF communication, for example. In this way, communication signals S, in particular a first communication signal S1 and/or a second communication signal S2, can be wirelessly transmitted to the communication device 20 of the vehicle 1. The transmission can be effected in an encrypted manner, for example, wherein an encryption unit 331 of the identification transmitter 300 is provided and/or electrically connected to the transceiver device 310 (directly or indirectly) to that end. Optionally, it is conceivable that a distance determination is also performed by the identification transmitter 300 based upon the communication signal S. To that end, for example, a processing unit 330 is used as a distance determination device 400.

Figure 11:
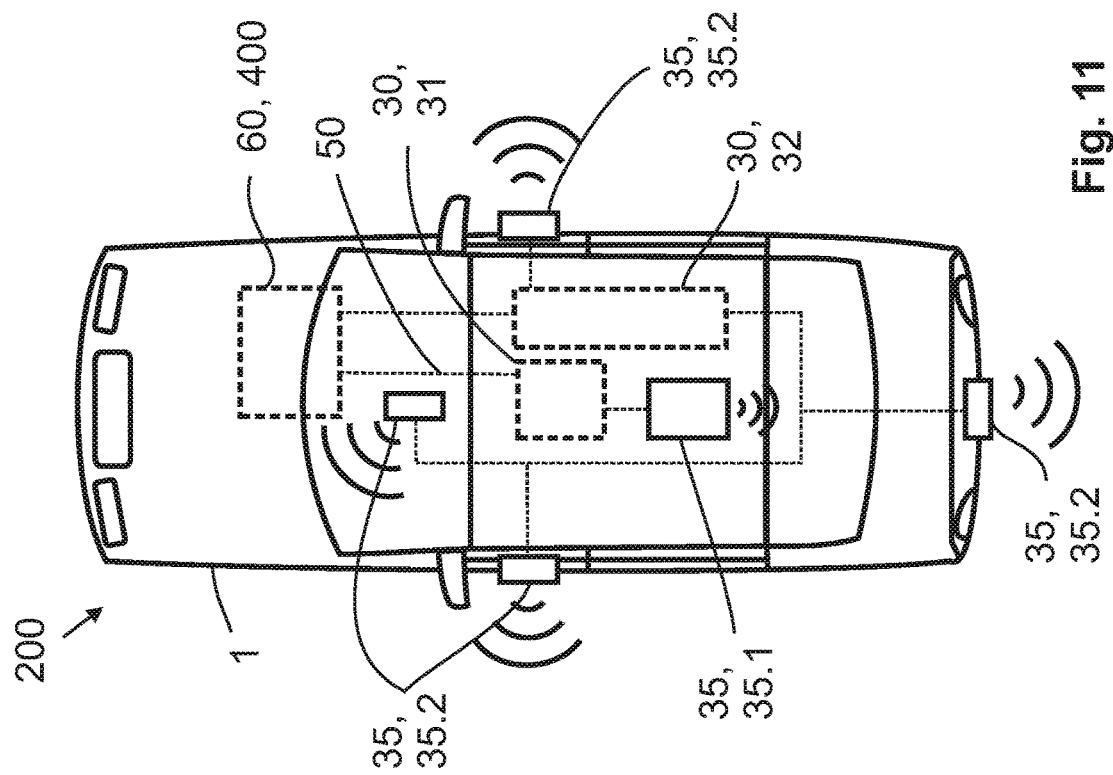

FIG. 11 shows a plan view of a vehicle 1, which comprises a security system 200 according to the invention. The security system 200 includes at least one communication device 20 here, which serves for the communication with an identification transmitter 300. FIG. 11 shows two different communication units 30 of the communication device 20, wherein, naturally, only one single of these communication devices 30 can be provided. In order to emit corresponding communication signals S by means of the communication device 20, the communication device 20 and/or the communication unit 30 includes at least one communication part 35, which is formed as an antenna and/or as a satellite. Thus, a first communication part 35.1 can be arranged on a roof of the vehicle 1, for example. Furthermore, it is conceivable that even further communication parts 35, in particular a second communication part 35.2, are arranged on the side region of the vehicle 1 and/or in the roof of the vehicle 1. It is also conceivable that further first communication parts 35.1 are provided on the vehicle 1 in addition to the first communication part 35.1, which in each case serve for the first communication with the identification transmitter 300. To that end, the first communication part 35.1 or each first communication part 35.1 is electrically connected to a first communication unit 31 of the vehicle 1. The second communication part 35.2 or each second communication part 35.2 serves for the second communication by the second communication unit 32 and is electrically connected to the second communication unit 32 of the vehicle 1. The electric connection of the first communication part 35.1 to the first communication unit 31 and/or of the second communication part 35.2 to the second communication unit 32 is effected, for example, via electric lines and/or via a transmission system 50, with the information transmitted via the transmission system 50 being transmitted particularly in an encrypted manner. Alternatively or in addition, it is possible that the electric connection between the first communication unit 31 to the processing device 60 and/or the electric connection of the second communication unit 32 to the processing unit 60 is effected via the transmission system 50. Just as well, the information, in particular the distance information detected by the first communication unit 31, can be transmitted to the processing device 60 via the transmission system 50 in an encrypted manner. The processing device 60 particularly serves as a distance determination device 400 for the (additional) determination, verification and/or evaluation of the distance information. Thus, the security of the distance determination and/or of the evaluation of the distance information can be ensured by the encrypted transmission. The first communication part 35.1 and/or the second communication part 35.2 is/are formed, for example, as an antenna and/or transmitter and/or receiver for the communication, in particular by means of a UWB communication method. Preferably, the first communication part 35.1 and/or the second communication part 35.2 are arranged asynchronously (on the vehicle 1) here.

Figure 12:
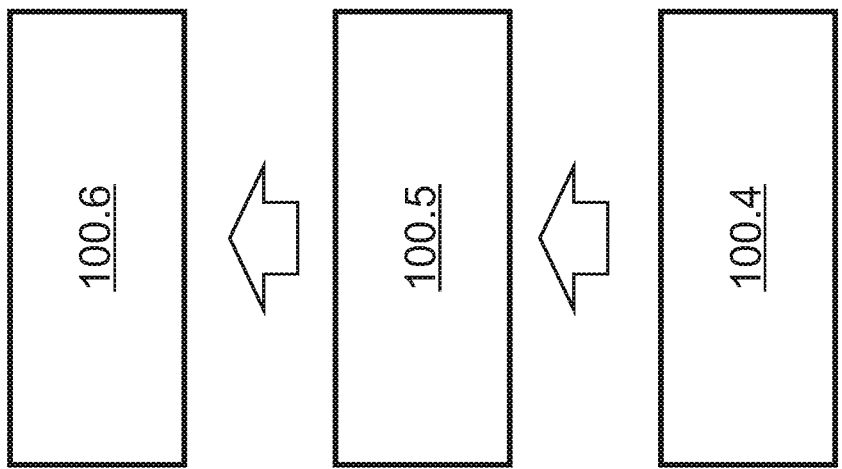
Figure 12:
Figure 12:
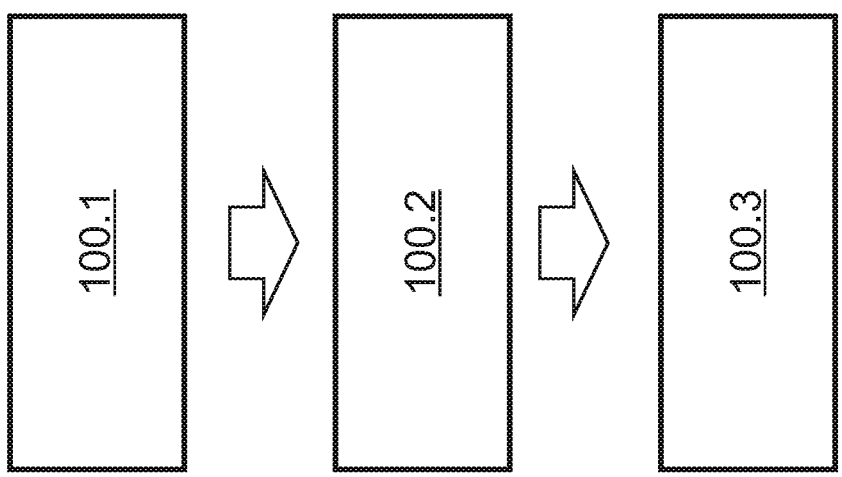

FIG. 12 schematically shows a method 100 according to the invention. Here, for the activation of at least one security function of the vehicle 1 according to a first method step 100.1, an approach of a mobile identification transmitter 300 to the vehicle 1 is monitored. According to a second method step 100.2, a distance determination is initiated, when the approach is detected. According to a third method step 100.3, the distance determination is effected, wherein at least one distance information about a distance of the identification transmitter 300 to the vehicle 1 is determined in that a communication between a transceiver device 310 of the identification transmitter 300 and a communication device 20 of the vehicle 1 is evaluated. According to a fourth method step 100.4, the distance information is evaluated by a processing device 60 of the vehicle 1, whereby a localization of the identification transmitter 300 relative to at least one security zone Z is effected. According to a fifth method step 100.5, a security information for the security system is determined dependent upon the localization. According to a sixth method step 100.6, the security information can be used subsequently in order to activate the security function of the vehicle dependent upon the security information. An authentication process can also be conducted to that end, for example.

The above explanation of the embodiments describes the present invention exclusively by way of examples. Individual features of the embodiments can naturally also be freely combined with one another, as far as technically reasonable, without departing from the scope of the present invention.

LIST OF REFERENCE CHARACTERS

1 Vehicle
2 Proximity sensor
10 Detection device
11 Detection evaluation unit
20 Communication device
30 Communication unit
31 First communication unit
31.1 Communication interface, ultra-wideband interface
31.2 Communication interface, Bluetooth interface
32 Second communication unit
32.1 Communication interface, LF interface
32.2 Communication interface, HF interface
35 Communication part, antenna
35.1 First communication part
35.2 Second communication part
40 Encryption device
50 Transmission system
51 Transmission station
60 Processing device
61 Evaluation device
62 Decryption device
63 Data storage unit
100 Method
100.1 First method step
100.2 Second method step
100.3 Third method step
100.4 Fourth method step
100.5 Fifth method step
100.6 Sixth method step
200 Security system
300 Identification transmitter
310 Transceiver device
320 Transceiver unit
321 First transceiver unit
322 Second transceiver unit
330 Processing unit
331 Encryption unit
400 Distance determination device
A Distance
K Communication field
S Communication signal
S1 First communication signal of a first communication
S2 Second communication signal of a second communication
Z Security zone
Z1 First security zone
Z2 Second security zone
Z3 Third security zone, comfort zone

What is claimed is:

1. A method for a security system of a vehicle, comprising the following steps:
   monitoring an approach of a mobile identification transmitter to the vehicle,
   initiating a distance determination, when the approach is detected,
   performing the distance determination, wherein at least one distance information about a distance of the mobile identification transmitter to the vehicle is determined in that a communication between a transceiver device of the mobile identification transmitter and a communication device of the vehicle is evaluated,
   evaluating the distance information by a processing device of the vehicle, whereby a localization of the mobile identification transmitter relative to at least one security zone is effected,
   wherein a security information for the security system is determined dependent upon the localization;
   wherein the distance information is determined in that a first communication between a first transceiver unit (321) of the transceiver device (310) and a first communication unit (31) of the communication device (20) is evaluated, wherein a second communication between a second transceiver unit (322) of the transceiver device (310) and a second communication unit (32) of the communication device (20) is used for the monitoring of the approach and initiation of the distance determination, wherein the first communication is carried out by means of ultra-wideband and the second communication is carried out by means of short-range wireless communication.

2. The method according to claim 1, wherein the distance information is determined in that a first communication between a first transceiver unit of the transceiver device and a first communication unit of the communication device is evaluated, wherein a second communication between a second transceiver unit of the transceiver device and a second communication unit of the communication device is used for at least the monitoring of the approach or initiation of the distance determination or authentication.

3. The method according to claim 1, wherein the security information is determined dependent upon the localization and an authentication of the mobile identification transmitter, wherein for the authentication a second communication is carried out between a second transceiver unit of the transceiver device and a second communication unit of the communication device, by a transmission of an authentication information by means of the second communication, at least prior to or after the distance determination.

4. The method according to claim 1, wherein the first communication is carried out by means of a wideband communication method and the second communication is carried out by means of at least a LF or short-range wireless communication or HF communication.

5. The method according to claim 1, wherein a wideband communication method, ultra-wideband, is used at least for the monitoring of the approach or for the initiation of the distance determination or for the distance determination or for authentication.

6. The method according to claim 1, wherein at least the monitoring of the approach or the initiation of the distance determination is effected by emitting an initiation signal, at least a LF or HF or short-range wireless communication or ultra-wideband initiation signal, wherein the emission is effected in at least a cyclic or repeated manner.

7. The method according to claim 1, wherein an emission of an initiation signal for the initiation is effected, at the earliest, when an approach of the mobile identification transmitter is detected, wherein the emission is carried out by a second communication unit of the vehicle.

8. The method according to claim 1, wherein at least a first communication unit of the communication device or a first transceiver unit of the mobile identification transmitter is activated at least upon initiation of the distance determination or after a successful authentication or identification of the mobile identification transmitter.

9. The method according to claim 1, wherein the distance determination is primarily effected by means of a second communication, and a determination of a further distance information for plausibility is effected secondarily by means of a first communication.

10. The method according to claim 1, wherein the localization of the mobile identification transmitter is at least initiated or carried out by the first communication for finding the mobile identification transmitter at least manually by an operator or automatically after performing the distance determination.

11. The method according to claim 1, wherein a first communication is used for communication in the event that interfering influences on a second communication are detected, and otherwise, the communication is effected by the second communication.

12. The method according to claim 1, wherein after a predetermined time period at least a turn-off is effected or an energy-saving state is activated at least for a first transceiver unit of the mobile identification transmitter or for a first communication unit of the communication device.

13. The method according to claim 1, wherein the determination of the distance information is effected by a processing unit of the mobile identification transmitter, and the distance information is transmitted from the transceiver device of the mobile identification transmitter to a detection device of the vehicle.

14. The method according to claim 1, wherein the distance information is encrypted at least partially based on a first key information, and is subsequently transmitted via a first communication to a detection device of the vehicle, wherein a transmission of an authentication information is effected via a second communication at least in an encrypted or forgery-proof manner based on a second key information.

15. The method according to claim 1, wherein the distance information is detected by a detection device of the vehicle, and is transmitted to the processing device after the detection by the detection device by means of a data transmission via a transmission system.

16. The method according to claim 1, wherein at least one comfort function of the vehicle is activated dependent upon the distance information, wherein the comfort function includes at least one of the following functions:
   turning on a front field lighting system of the vehicle,
   turning on an interior lighting system of the vehicle,
   turning on at least one headlamp of the vehicle,
   activating an illumination sequence of a vehicle lighting system,
   activating an acoustic output at the vehicle,
   turning on a heating system of the vehicle,
   activating a function of an electronic device of the vehicle, a navigation function, a detection of traffic information,
   opening of vehicle doors.

17. The method according to claim 1, wherein the means of short-range wireless communication is operated according to at least one of Bluetooth™ protocol and Bluetooth™ Low Energy protocol.

18. A security system of a vehicle including:
at least one communication device of the vehicle for communication with a transceiver device of a mobile identification transmitter,
at least one processing device of the vehicle,
   wherein an approach of the mobile identification transmitter to the vehicle is monitored, and an initiating of a distance determination is performed when the approach is detected,
   wherein at least one distance information about a distance of the mobile identification transmitter from the vehicle is determined for the distance determination in that the communication is evaluated, and
   the distance information is evaluated by the processing device, whereby a localization of the mobile identification transmitter relative to at least one security zone is effected,
   wherein a security information for the security system is determined dependent upon the localization;
   wherein the distance information is determined in that a first communication between a first transceiver unit (321) of the transceiver device (310) and a first communication unit (31) of the communication device (20) is evaluated, wherein a second communication between a second transceiver unit (322) of the transceiver device (310) and a second communication unit (32) of the communication device (20) is used for the monitoring of the approach and initiation of the distance determination, wherein the first communication is carried out by means of ultra-wideband and the second communication is carried out by means of short-range wireless communication.

19. The security system according to claim 18, wherein the security system is operated in accordance with a method for a security system of a vehicle, the method comprising the following steps:
   monitoring an approach of a mobile identification transmitter to the vehicle,
   initiating a distance determination, when the approach is detected,
   performing the distance determination, wherein at least one distance information about a distance of the mobile identification transmitter to the vehicle is determined in that a communication between a transceiver device of the mobile identification transmitter and a communication device of the vehicle is evaluated, and
   evaluating the distance information by a processing device of the vehicle, whereby a localization of the mobile identification transmitter relative to at least one security zone is effected, wherein a security information for the security system is determined dependent upon the localization.

20. A mobile identification transmitter for the authentication at a security system (200) of a vehicle, wherein wireless communication is performed between the mobile identification transmitter and a communication device of the vehicle, wherein a first transceiver unit for performing a first communication with a first communication unit of the vehicle, and a second transceiver unit for performing a second communication with a second communication unit of the vehicle are provided;
   wherein at least one distance information about a distance of the mobile identification transmitter from the vehicle is determined for the distance determination in that the communication is evaluated, and
   the distance information is evaluated by the processing device, whereby a localization of the mobile identification transmitter relative to at least one security zone is effected,
   wherein a security information for the security system is determined dependent upon the localization;
   wherein the distance information is determined in that a first communication between a first transceiver unit (321) of the transceiver device (310) and a first communication unit (31) of the communication device (20) is evaluated, wherein a second communication between a second transceiver unit (322) of the transceiver device (310) and a second communication unit (32) of the communication device (20) is used for the monitoring of the approach and initiation of the distance determination, wherein the first communication is carried out by means of ultra-wideband and the second communication is carried out by means of short-range wireless communication.

21. The mobile identification transmitter according to claim 20, wherein the mobile identification transmitter includes an encryption unit, whereby an encrypted transmission of a distance information to the vehicle is performed.

* * * * *

UNITED STATES PATENT AND TRADEMARK OFFICE
CERTIFICATE OF CORRECTION

PATENT NO. : 11,084,460 B2
APPLICATION NO. : 16/080022
DATED : August 10, 2021
INVENTOR(S) : Jan Breer et al.

Page 1 of 1

It is certified that error appears in the above-identified patent and that said Letters Patent is hereby corrected as shown below:

In the Specification

Column 13, Line 64, "FIGS. 2, 3" should be changed to —FIGS. 2, 3, and 4—

Column 13, Line 66, "FIGS. 5, 6" should be changed to —FIGS. 5, 6, and 7—

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*